UNITED STATES PATENT OFFICE.

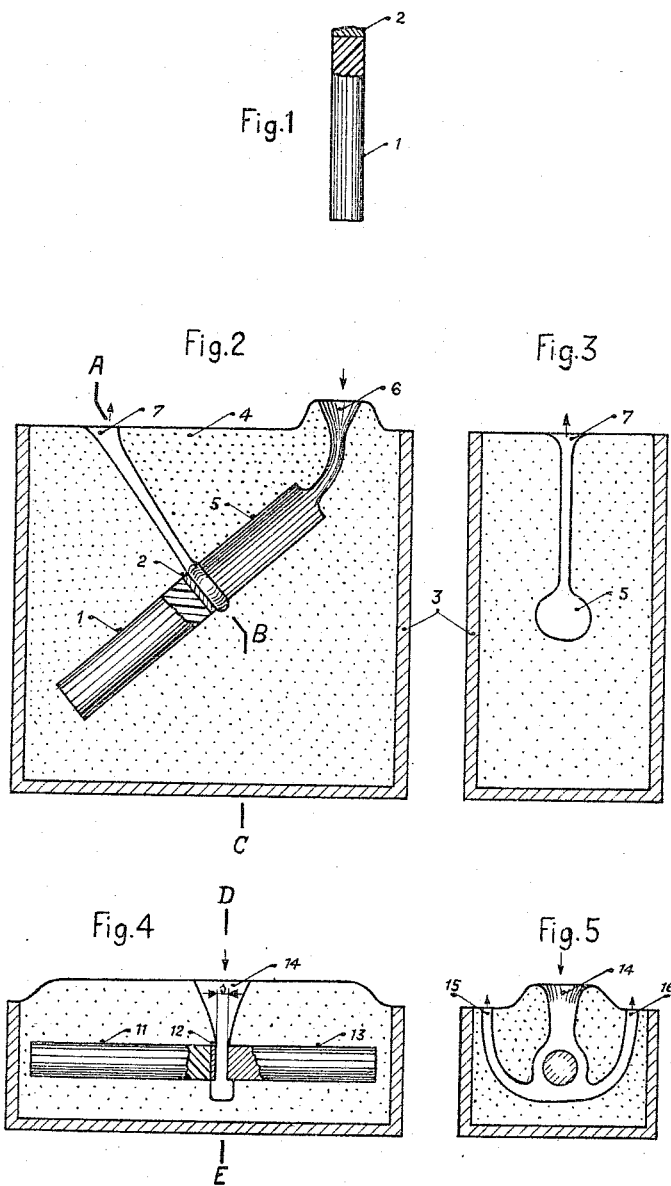

CONRAD KOHLER, OF ZURICH, SWITZERLAND.

PROCESS FOR WELDING TWO METALS OF UNEQUAL FUSIBILITY.

1,296,815.  Specification of Letters Patent.  Patented Mar. 11, 1919.

Application filed December 28, 1917. Serial No. 209,307.

*To all whom it may concern:*

Be it known that I, CONRAD KOHLER, a citizen of the Republic of Switzerland, residing at Hardturmstrasse 19, Zurich 5, Switzerland, have invented certain new and useful Improvements in Processes for Welding Two Metals of Unequal Fusibility; and I do hereby declare the following to be a clear, full, and exact description of the invention, such as will enable others skilled in the art to which it appertains to make and use the same, reference being had to the accompanying drawing, and to letters or figures of reference marked thereon, which form a part of this specification.

This invention relates to a process for welding two metals of unequal fusibility by means of a previous welding on of a thin layer of an auxiliary metal to the metal which has the lesser fusibility. According to the novel process, said auxiliary metal layer is welded on to the metal of lesser fusibility by means of a reducing flame (autogenous process).

For the auxiliary metal layer that has to be welded on to the metal of lesser fusibility by means of the reducing flame, the same metal as the second metal to be connected can also be employed. The process can especially be employed for the welding of copper to iron or steel for electric machines, by first welding by an autogenous welding process a layer of a metal of high electric conductivity on to a piece of iron or steel, and then welding copper to the said layer. In such a case, the auxiliary layer can consist of copper. This process can be especially advantageously employed when it is desired to connect iron and copper with one another in such a manner that the electric current led through such a combined or joined piece, meets with the least possible resistance at the point of connection.

According to a process hitherto known for the connection of two metals of unequal fusibility, it has already been proposed to weld a thin auxiliary layer to the metal of lesser fusibility. It was, however, merely prescribed that this had to be done by means of a blow-pipe, but without specially prescribing the working of this blow-pipe or of its flame. If an air blow-pipe, (for instance an oxyhydrogen blow-pipe) be employed, an ample quantity of air, *i. e.* an oxidizing medium, will be led to the weld. Thus a layer of oxid (slag)) is formed, which renders impossible a reliable and uniform connection of the auxiliary layer first of all with the first metal, and then with the second.

The welding process according to the present invention solves the problem of welding together as closely as possible, two metals of unequal fusibility.

In the autogenous welding process, where either oxygen and hydrogen, or oxygen and acetylene, are employed in the welding burner, a reducing flame is produced, *i. e.* either hydrogen or acetylene is present in excessive quantities. Every formation of slag is avoided. The melted auxiliary metal is just as pure as the topmost layer of the metal with the lesser fusibility, and the latter, after the first welding step, is provided with a completely pure coating, which can be then easily and cleanly joined to the second metal to be welded.

The drawing shows two examples, Figure 1 illustrating an iron bar on the top end of which a layer of copper has been welded by the autogenous welding process, and which is thus prepared for the welding on of a fairly large quantity of copper. Figs. 2 and 3 show how the same iron bar is embedded in a mold, for the casting-on of a copper bar. Fig. 4 shows how an iron rod prepared by the autogenous welding process and a copper rod are embedded in a mold, so that they can be welded together by means of liquid copper. Figs. 3 and 5 are cross-sections through the apparatuses shown in Figs. 2 and 4.

Referring to the drawing, 1 denotes in Fig. 1 an iron bar of circular cross-section, to the top end of which copper has been applied with the aid of an oxy-acetylene apparatus, a suitable quantity of copper having been melted off a thin copper rod by means of a reducing flame. This is done when the upper part of the iron bar has been made red hot by means of the oxy-acetylene flame. After cooling, the upper end of the piece 1, 2, which has been thus joined, is cleanly rounded off, either by machining or filing, especially at its top end surface, and the bar is then placed in a mold as shown in Fig. 2. 3 is the box which is nearly filled with molding sand. The bar 1 is rammed in, pointing upward in an oblique direction, so that the smoothly planed end surface of the copper layer 2 is at the top. In the continuation of the joined bar 1, 2, a hollow 5 is made in the sand, corresponding in shape to that of the copper bar that has to be cast on. Fig. 3 shows an imaginary section through the mold on the line A—B—C of Fig. 2. Liquid copper is now poured in at the funnel 6 until it not only fills up the hollows in the sandform 4, but overflows at the funnel 7 for a sufficiently long time for one to safely assume that the surface of the auxiliary layer 2 has melted. This guarantees that the copper layer 2 closely unites with the liquid copper poured in through the funnel 6. After the casting has taken place, the mold can be taken out of the box 3, and the combined bar freed from sand. It is now ready for further machining.

Fig. 4 shows a longitudinal section through a mold, in which a copper bar 13 has to be welded on to an iron bar 11, which is prepared in a similar way to the iron bar 1 shown in Fig. 1. At the one end of the iron bar, a copper plate 12 is first welded on by the autogenous welding process. The combined bar 11, 12 lies in the same straight line with the copper bar 13, but there is a small clearance s between the two, which clearance s is filled up with the liquid copper which is now poured in. Fig. 5 is an imaginary section through the mold on the line D—E of Fig. 4. Liquid copper is now poured in at the funnel 14 until it freely overflows at 15 and 16, and one can safely assume that both the auxiliary layer 12 at its free end, and also the copper bar 13 at its inner end, have melted and the melted parts closely united with one another. The metal is then allowed to cool, after which the casting can be taken out of the mold and machined.

What I claim now as my invention is:

1. A process for welding two metals of unequal fusibility, which comprises welding a layer of the metal of easier fusibility to the metal of less fusibility by a reducing flame thereby simultaneously effecting the heating of the metals to their uniting temperature and simultaneously reducing any oxids to metal, and thereafter welding to said layer a body of like metal.

2. A process for welding two metals of unequal fusibility, consisting in first welding an auxiliary layer of metal to the metal of lesser fusibility by a reducing flame, embedding said joined metal piece in a mold, providing in the mold a hollow reaching to said metal piece, pouring the second metal in a liquid state into said hollow and taking the cooled casting out of the mold.

3. A process for welding two metals of unequal fusibility, consisting in first welding an auxiliary layer of metal to the metal of lesser fusibility by a reducing flame, cleanly rounding off the auxiliary metal layer joined to the first metal, embedding the joined metal piece in a mold, providing in the mold a hollow reaching to said metal piece, pouring the second metal in a liquid state into said hollow and taking the cooled casting out of the mold.

4. A process for welding two metals of unequal fusibility, consisting in first welding an auxiliary layer of metal to one end of the metal-piece of lesser fusibility by a reducing flame, cleanly rounding off the free end surface of the auxiliary layer of metal, embedding the joined metal-piece in a box filled with molding sand, providing a hollow in the sand, the hollow laying in the continuation of the joined metal-piece, pouring the second metal to be welded in a liquid state into said hollow and letting it overflow until the surface of the auxiliary layer of metal is melted and taking the cooled casting out of the box.

5. A process for welding copper to iron, consisting in applying copper to the top end of a hot iron bar with the aid of a reducing flame, cleanly rounding off the upper end of the joined bar, placing the metal bar in a box filled with sand, providing a hollow in the sand reaching to the smoothly rounded end surface of the joined bar, pouring liquid copper into said hollow and letting it overflow until the surface of the auxiliary layer has been melted and taking the cooled casting out of the box.

In testimony that I claim the foregoing as my invention, I have signed my name.

CONRAD KOHLER.

Copies of this patent may be obtained for five cents each, by addressing the "Commissioner of Patents, Washington, D. C."